United States Patent [19]

Myers

[11] Patent Number: 4,739,976
[45] Date of Patent: Apr. 26, 1988

[54] SUSPENSION FOR HEAVILY LOADED HAUL TRUCKS

[75] Inventor: Walter I. Myers, Tulsa, Okla.

[73] Assignee: Wiseda Ltd., Cardin, Okla.

[21] Appl. No.: 796,227

[22] Filed: Nov. 8, 1985

[51] Int. Cl.⁴ .............................................. F16F 5/00
[52] U.S. Cl. ................................. 267/64.26; 188/269; 267/64.15
[58] Field of Search ............... 188/268, 269, 322.11, 188/322.12; 267/64.11, 64.13, 64.15, 64.25, 64.26, 35

[56] References Cited

U.S. PATENT DOCUMENTS

| 2,056,106 | 9/1936 | Kuhn | 267/35 |
|---|---|---|---|
| 2,163,255 | 6/1939 | Binder et al. | 188/322.12 |
| 2,642,278 | 6/1953 | Westcott | 267/64.15 |
| 2,721,074 | 10/1955 | de Carbon | 188/269 X |
| 2,856,035 | 10/1958 | Rohacs . | |
| 2,873,963 | 2/1959 | Taylor . | |
| 3,168,302 | 2/1965 | Burris . | |
| 3,304,076 | 2/1967 | Doversberger . | |
| 3,387,840 | 6/1968 | Bechman et al. . | |
| 3,469,661 | 9/1969 | Hoffmann et al. | 188/269 |
| 3,598,353 | 8/1971 | De Grey | 267/35 X |
| 3,647,239 | 3/1972 | Katsumori | 188/269 X |
| 3,806,105 | 4/1974 | Knoishi et al. | 267/35 X |
| 3,993,294 | 11/1976 | Wossner et al. | 267/64.15 |
| 4,167,991 | 9/1979 | Karalins et al. | 188/322.12 |
| 4,235,317 | 11/1980 | Maciejewski | 188/269 X |
| 4,428,567 | 1/1984 | Fournales | 188/269 X |
| 4,506,869 | 3/1985 | Masclet et al. | 267/64.15 |

Primary Examiner—Duane A. Reger
Attorney, Agent, or Firm—Laney, Dougherty, Hessin & Beavers

[57] ABSTRACT

An improved suspension for heavily loaded haul trucks. A piston supported by a hollow rod is insertible within a cylinder, a check valve is provided in the lower end of the rod with the seat having damping orifices extending therethrough. An inert gas such as nitrogen is provided in the hollow rod and a silicone fluid is provided in the cylinder below the inert gas.

20 Claims, 5 Drawing Sheets

ROD DIA. = 5.00 IN.
VOL. NIT. = 200 IN³
VOL. FLUID = 1400 IN³
PRE·LOAD = 1200 PSI

ROD DIA. = 5.000 IN.
VOL. NIT. = 150 IN³
VOL. FLUID = 1150 IN³
INNER PRES. = 2000 PSI

SUSPENSION FOR HEAVILY LOADED HAUL TRUCKS

BACKGROUND OF THE INVENTION

1. Field of the Invention.

This invention relates to an improved suspension for heavily loaded haul trucks.

2. Setting of the Invention.

As is well known, it has been difficult to provide proper suspension for heavily loaded off highway haul trucks due to the great disparity between the wheel loads in the loaded and unloaded condition. Suspension systems that enhance the driver comfort when the truck is unloaded tend to be hard on the truck frame and those type suspension systems that offer better characteristics in the loaded condition as far as the frame and the other structure is concerned, tend to be harsh and rough on the driver in the unloaded state.

Over the past twenty (20) years or so, off highway trucks have generally used one of three types of suspensions. These are:

(1) Rubber columns;
(2) Gas and oil systems;
(3) Silicon fluids.

The initial rubber spring suspension was based on rubber pads of the type used in railroad drawbar shock absorbers. A stack of these pads generates a load deflection curve very nearly ideal for the application. That is, at low loads the spring rate is low making the natural frequency low which is desirable for driver comfort. The problem is that the heat generated from its constant compression and expansion ages the rubber very rapidly and it loses the resiliency required for a low spring rate. This results in a high natural frequency when a vehicle is unloaded and thus, a rough ride for the driver. Another type rubber spring uses a belted rubber cylinder to produce a similar load/deflection curve but it also suffers from aging and loss of resiliency.

The gas/oil type suspension system makes use of the compressibility of an inert gas to provide the spring rate and the oil to provide a damping fluid. Since the spring rate of this type suspension system varies inversely to the pressure squared, the frequency curve approaches the ideal i.e., load. However, the load deflection curve for a reasonable volume of gas has too much curvature resulting in stiff spring on the heavily loaded part of the curve with very little allowance for high overloads.

The silicon fluid spring uses the compressibility of silicon as a spring element. This has the advantage of also using the fluid for a dampening fluid. The compressibility of this fluid is not high so large volumns are required if reasonable strokes are used. Also the compressibility of the fluid is very near linear so some compromise must be made on the spring frequency rate, usually resulting in a rough ride when the truck is empty.

SUMMARY OF THE INVENTION

This concerns a suspension device for heavily loaded off highway trucks. The suspension device includes a lower cylinder and an upper hollow rod with an annular piston at the lower end which is insertible in a slidable relationship within the cylinder. The interior of the piston and interior of the rod define an operating fluid space. The lower part of this space is filled with a silicon fluid and the upper part is filled with an inert gas such as nitrogen with an interface therebetween. Preferably, the lower end of the hollow rod is provided with a check valve including a spring loaded ball valve forced against a seat with damping orifices extending through the edge portion of the seat. By using this system, I use the better features of the gas/oil type and the silicone fluid type suspension system. A relatively small volume of nitrogen gas is compressed over the low load part of the load deflection curve, resulting in an ideal spring rate for an empty truck. During this initial compression, the silicone fluid is compressed very little. As the load on the truck is increased, the silicone fluid is then compressed to a large extent which provides an ideal spring rate for a loaded truck. I have three variables, gas volume, fluid volume and pre-load pressure which I can use and by selecting the proper gas volume, fluid volume and the pre-load pressure, I can fine tune my suspension system to the requirements of a particular truck.

It is an object of this invention to provide a suspension system which uses the better features of the gas/oil system and the silicone fluid system to obtain a here before unknown suspension system.

A better understanding of the invention can had from the following description taken in conjunction with the drawings.

DETAILED DESCRIPTION OF THE PREFERRED EMBODIMENT

Figure 1:
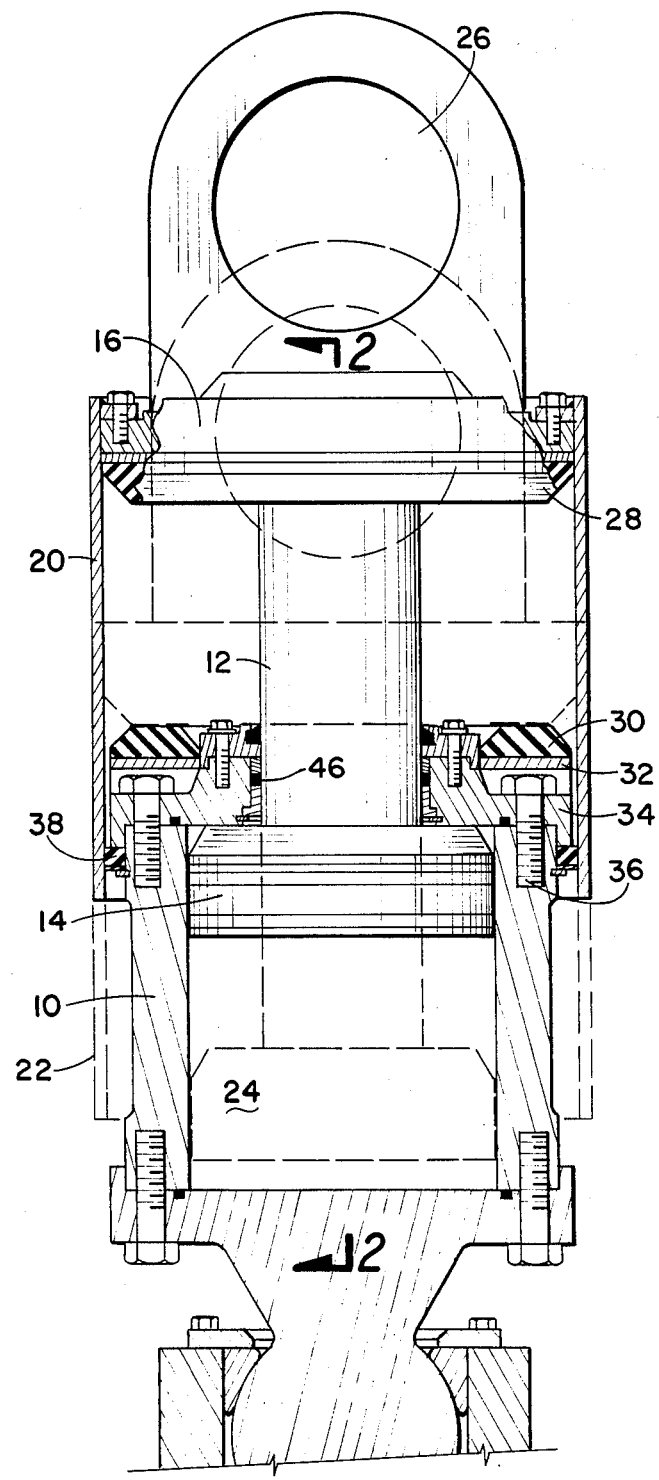
FIG. 1 is an elevation view partly in section of the suspension device of my invention.
Figure 2:
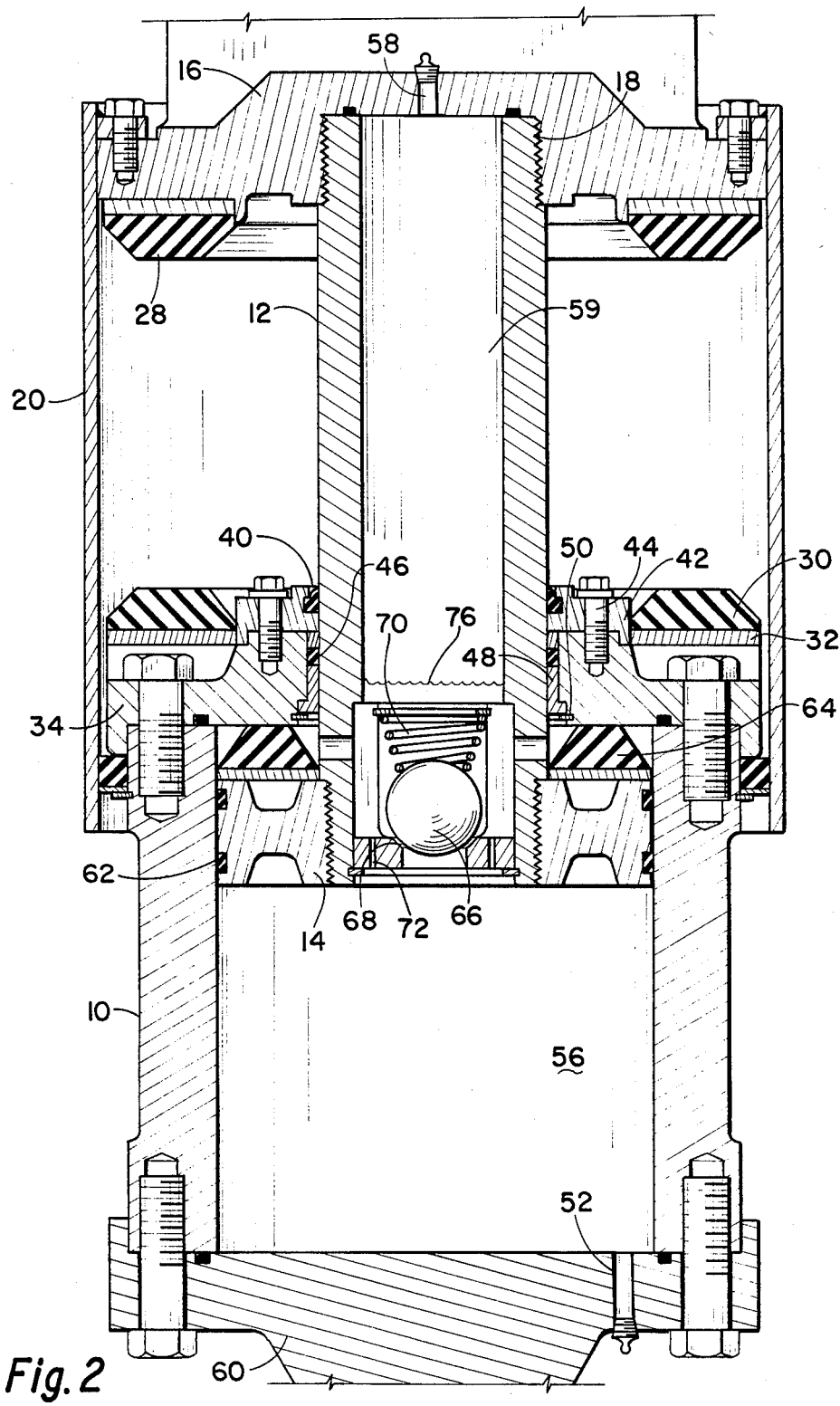
FIG. 2 is a view taken along the line 2—2 of FIG. 1.

Attention is first directed to FIGS. 1 and 2. Shown thereon is a suspension system or device utilizing my invention of using the selected features of an inert gas such as nitrogen and a silicone fluid. Shown thereon is a cylinder 10 and a hollow rod 12 connected to a piston 14 which extends into cylinder 10. The rod 12 is supported from the top by rod end 16 and is connected thereto by the threads 18. A dust cover 20 extends down from rod 16 to the upper part of the cylinder 10. Upon compression it will extend downwardly as indicated by the dashed line 22 in FIG. 1. At this time, the piston 14 will be down to the dashed line indicated by 24 also in FIG. 1. Rod end 16 is provided with a receptacle 26 for receiving a ball bushng. On the lower side of rod end 16, is a rubber overload pad 28 which mates with overload pad 30 supported at the upper end of cylinder 10 by annular plate 32 which is supported from seal carrier 34 which is attached to the upper end of cylinder 10 by bolts 36. A dust seal 38 is provided between the inner wall of dust cover 20 and the upper end of cylinder 10. A wiper 40 is carried by wiper carrier 42 which is connected to seal carrier head 34 by bolts 44. A pressure seal 46 is provided between seal carrier head 34 and the outer wall of rod 12. It is held there by sleeve 48 held by retaining ring 50.

Attention is now directed especially to FIG. 2 which shows an inlet passage 52 formed in a lower end 60 of cylinder 10 for use in adding silicone fluid to lower space or volume 56 within the cylinder 10. An inlet passage 58 is provided in rod end 16 so that nitrogen may be injected into the gas space 59 within rod 12. The space within the rod 12 and cylinder 10 can be referred to as "fluid space" which contains a gas and a silicone fluid.

Piston 14 is provided with wear rings 62 between it and the inner wall of cylinder 10. Rebound pads 64 are provided above piston 14 and attached thereto in a known manner.

The lower end of the hollow rod 12 is provided with a check valve which includes a ball 66, a seat 68 and a spring 70 for urging the ball 66 to the seat 68. The outer periphery of the seat 68 is provided with vertical dampening orifices 72 which are always open.

In operation, I fill lower space 56 with a silicone fluid which can be a dimethyl polysiloxane fluid such as that manufactured by General Electric Company. This dimethyl polysiloxane should have a viscosity of 50 centistokes and higher with it being preferred to be about 100 centistokes. I inject the required silicone fluid through passages 52 into lower space 56. I next inject the selected quantity of nitrogen through inlet passage 58 until I reach the desired pressure on the fluid and then close the passage 58 with known means not fully illustrated. These volumes can be calculated as will be explained. There is an interface 76 between the nitrogen and the silicone fluid. The volume of the gas is normally small compared to the volume of the silicone fluid. The silicone fluid will normally be in the range of about 8 to about 12 times the volume of the nitrogen at the initial loading pressure of between about 800 and 1200 psi of the system shown in FIGS. 1 and 2. When the truck is empty, as it is driven down the highway, the compression will be mostly in the compression of the gas resulting in an ideal spring rate for an empty truck. As the load is increased, the compressibiity of the silicone fluid then becomes important and the compressibility of the silicone fluid provides an ideal spring rate for a loaded truck.

For a group of variables having a selected rod diameter, a selected volume of nitrogen and selected volume of silicone with a selected preload, I can generate for each such group, a load deflection curve and a natural frequency curve. I can do this using the following equations.

(Deflection)

$$\text{STROKE} = \frac{G\phi}{AR}\left(1 - \frac{IP}{P}\right) + \frac{I\phi}{AR}\left[x(P - IP) + y(P^{\frac{1}{2}} - IP^{\frac{1}{2}}) + z(P^{\frac{1}{4}} - IP^{\frac{1}{4}})\right]$$

(Natural Frequency)

$$FN = \frac{30}{\pi}\left(\frac{gk}{L}\right)^{\frac{1}{2}}$$

Where $$k = \frac{AR}{\left[\frac{G\phi \cdot IP}{AR \cdot P^2} + \frac{F\phi}{AR}\left(x + \frac{y}{2P^{\frac{1}{2}}} - \frac{z}{4P^{\frac{3}{4}}}\right)\right]}$$

FN = Instantanious Natural Freq. in c/min.
GO = Initial (Charge) Gas Volume
AR = Rod Area
IP = Initial (Charge) Pressure
P = Cylinder Pressure (L/AR) L = Load on Strut
FO = Initial Fluid Volume
x,y,z are Constants having to do with the compressibility of the fluid
g = Accel of Gravity.

Figure 3:
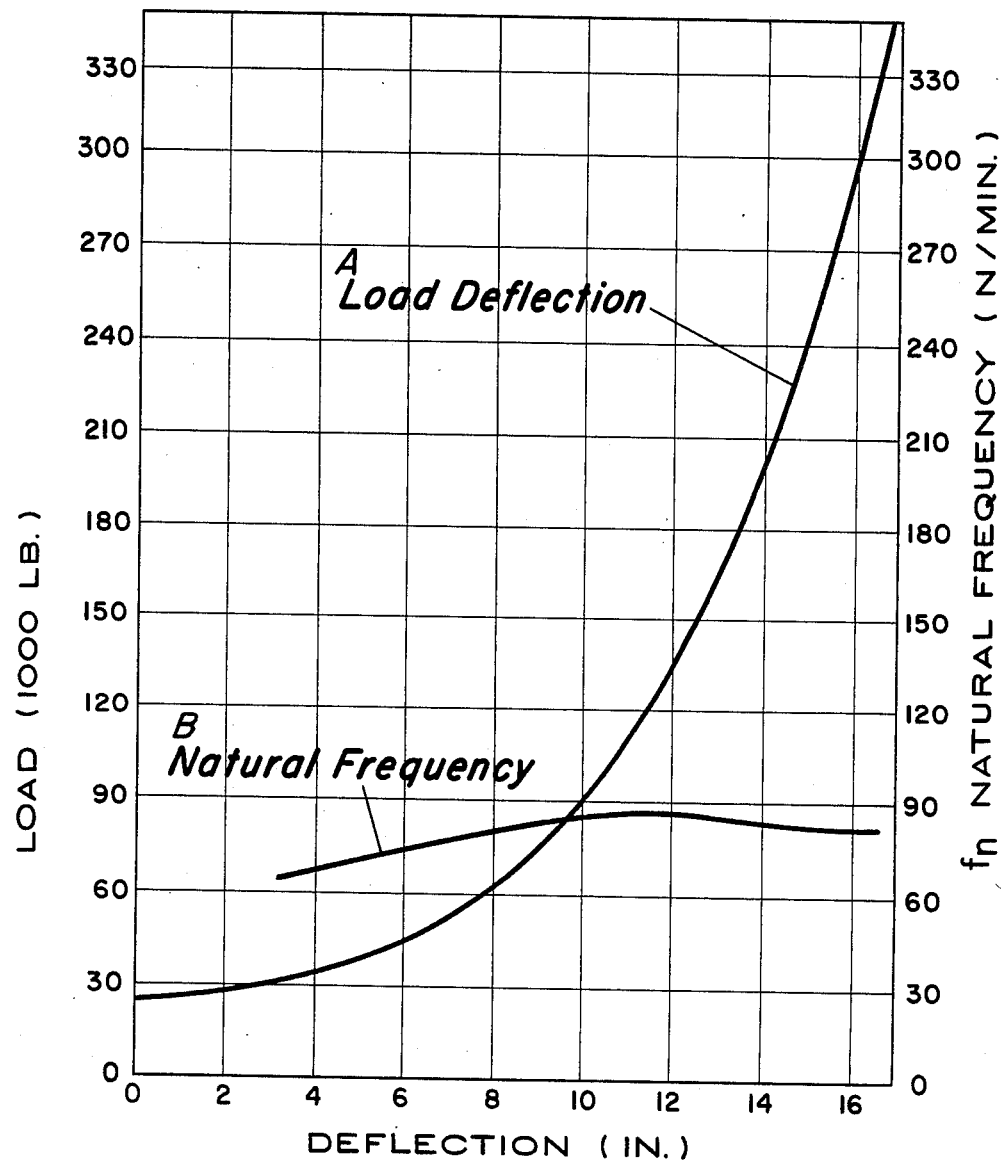
FIG. 3 shows a natural frequency curve and a low deflection curve for selected volumes of nitrogen and silicone with a pre-selected load size and rod diameter.

I selected one set of criteria to produce the curves on FIG. 3. The criteria there was a rod diameter of 5 inches, a volume of nitrogen of 200 cubic inches, a volume of silicone of 1,400 cubic inches with the volumes being measured at a preload setting of 1,200 psi. For these conditions I get a load deflection curve A and a natural frequency curve B. I, of course, generate a plurality of points for different load conditions, detect the deflections of the natural frquencies and then connect the curves as dictated by those points. With this selection of criteria, I maintain a frequency of less than 90 cycles per minute for an empty weight of 80,000 pounds and a loaded weight of 170,000 pounds.

Figure 4:
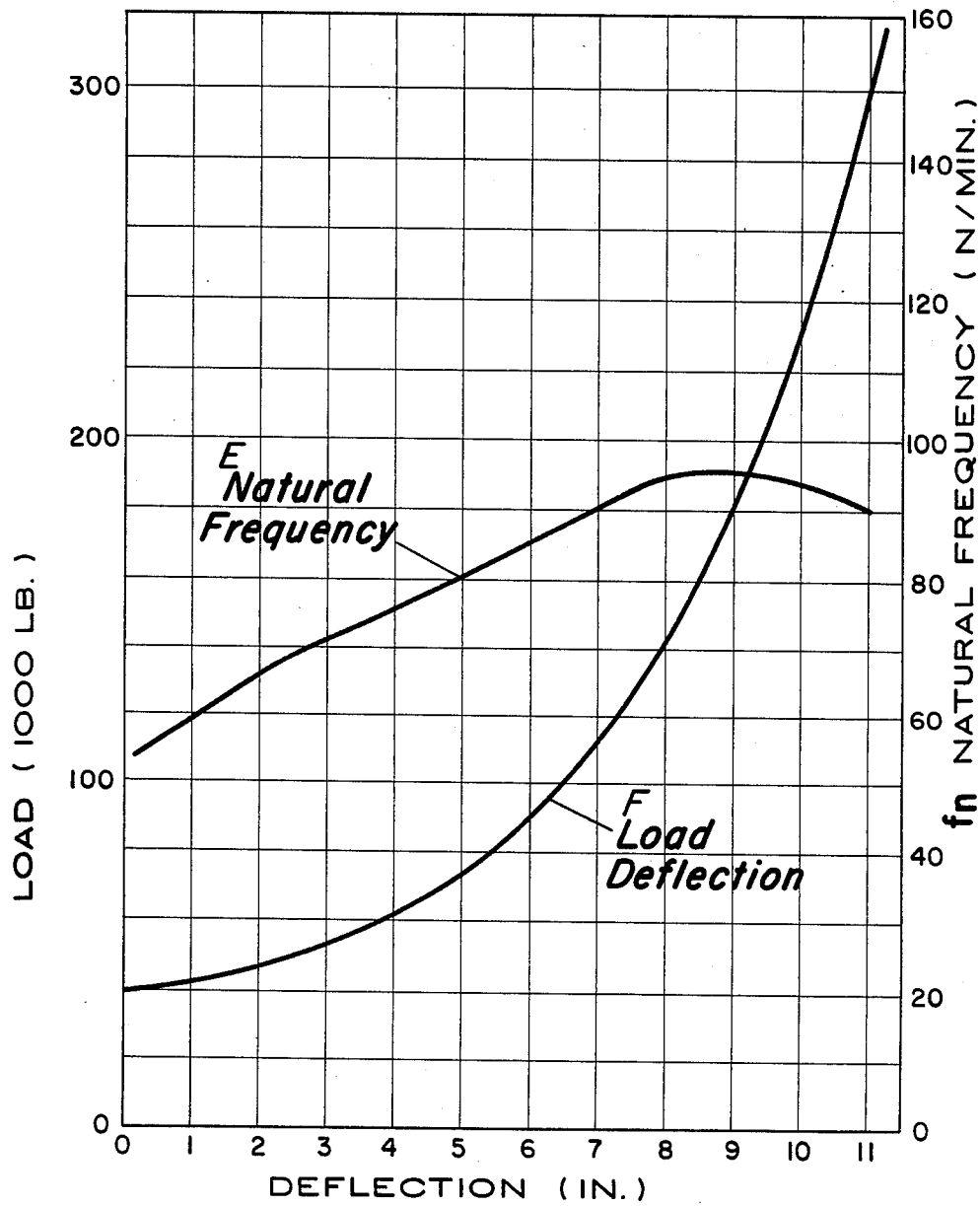
FIG. 4 is similar to FIG. 3 except there is a different initial load and different volume.

Attention is next directed to FIG. 4 which shows another set of criteria in which the rod diameter was 5 inches, the volume of nitrogen was 150 cubin inches, the volume of silicone fluid was 1,150 cubic inches and the initial loading pressure of 2,000 psi. Here, I also have a frequency curve E and a load curve F. The compression of the gas has the largest influence upon this frequency curve up until the load reaches about 150,000 psi. From thereon, the compressibility of the silicone fluid has the largest influence upon this curve E. It can be seen that for any loads under 300,000 pounds that I have maintained the natural frequency of less than 100 cycles per minute. This is considered excellent. In reading the curves to find deflection, start at the load value on the left-hand ordinate and move horizontally until the "load deflection" curve is intersected and then vertically down to the abscissa which indicates the deflection value in inches. To determine the frequency for a particular load, move vertically from the deflection already determined to intersect the "natural frequency" curve and move horizontally to the right-hand ordinate for the value of the natural frequency.

Figure 5:
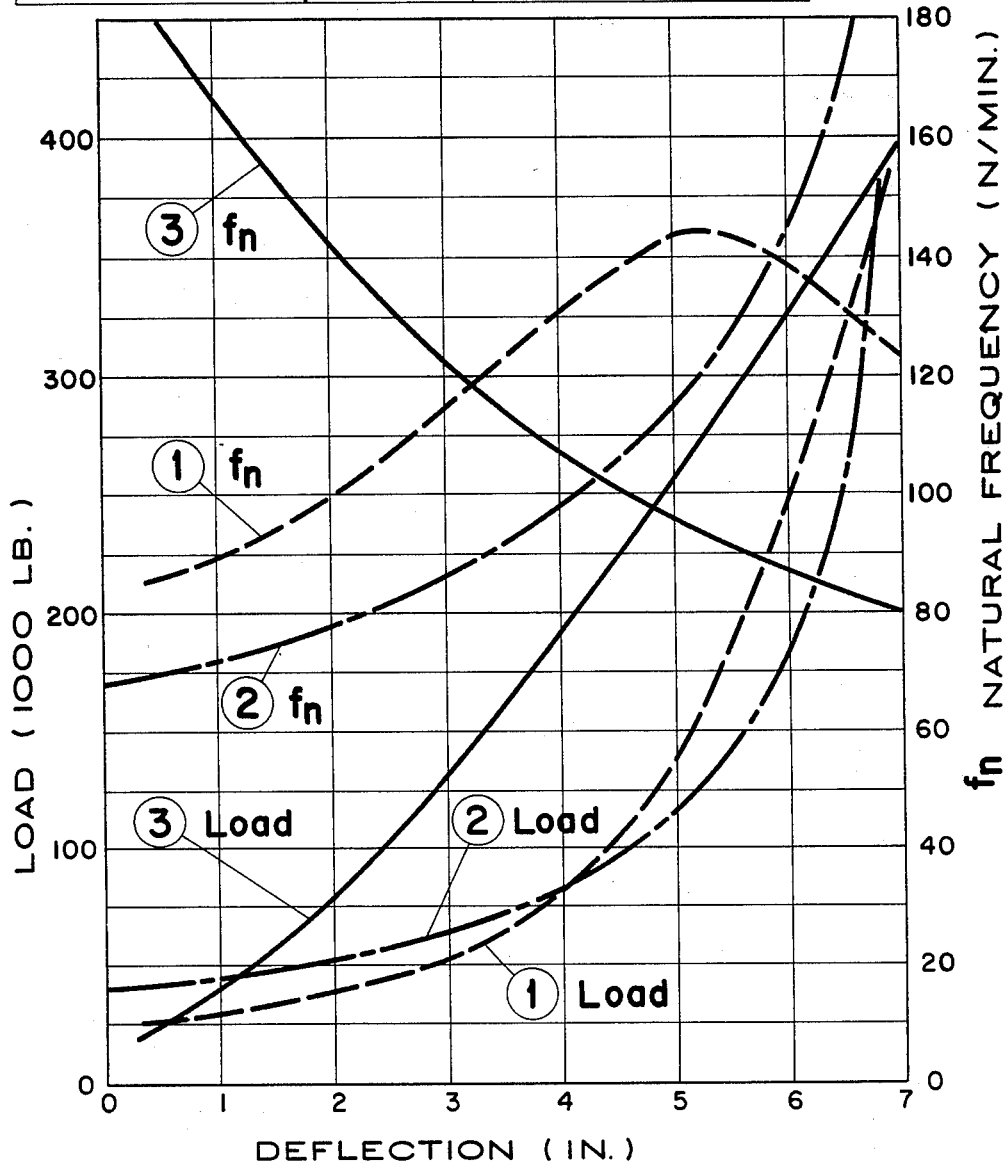
FIG. 5 are three sets of curves with each set having a load and frequency curve for three different suspension systems.

Attention is next directed to FIG. 5. Shown thereon are three sets of curves for three different sets of criteria. The first set is shown by the dashed curve, the second set by the broken line and the third set by the solid line. The first set of curves or the dashed curves used silicone fluid and nitrogen; the second set used all gas and the third set was used all fluid. One can see that the frequency curve for the silicone and nitrogen reached a maximum of about 145 and then came back down to about 122 whereas the other two had usuable frequency characteristics. For example, the all gas curve started off low enough at about 70, a relatively low load, but then for the higher load it went way off the curve. The all fluid started at a very high frequency for the low load which was unacceptable. Rod diameters are chosen to support the loads at preload and maximum anticipated loading and to get the required stroke.

I calculate curves such as shown in FIGS. 3, 4, and 5 using many sets of variables within practical limitations. I then select the set of practical variables that give the best suspension characteristics.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A suspension device for heavily loaded trucks comprising:
   a cylinder;
   a hollow rod extending upwardly from said cylinder and having a piston slidably insertable within said cylinder, there being a fluid space defined as a volume within said cylinder and said hollow rod, said fluid space having an upper part within said hollow rod and a lower part at least partially within said cylinder, said upper part being relatively smaller than said lower part;
   silicone fluid within said lower part of said fluid space; and
   an inert gas in said upper part of said fluid space.

2. The suspension device of claim 1 in which said gas is nitrogen and there is an interface between said nitrogen and said silicone fluid.

3. The device of claim 1 further comprising a check valve in said piston, said check valve including a ball and seat and defining a damping orifice through said seat, said check valve and orifice providing controlled communication between said hollow rod and said cylinder.

4. A suspension device for heavily loaded off-highway trucks comprising:
   a cylinder;
   a hollow rod extending upwardly from said cylinder and having a piston slidably insertable within said cylinder, so that there is a fluid space defined within said cylinder and said hollow rod, said fluid space having a lower part and an upper part relatively smaller than said lower part;
   an inert gas having a high compressibiity provided in said upper part of said fluid space; and
   a silicone fluid in said lower part of said fluid space.

5. The suspension device of claim 4 in which said silicone fluid is dimethyl polysiloxane.

6. The suspension system of claim 4 wherein:
   a volume of said silicone fluid is in a range of about eight to about twelve times a volume of said inert gas at an initial pressure of between about 800 to about 1200 psi.

7. The suspension device of claim 1 wherein a volume of said lower part of said fluid space is in a range of about eight to about twelve times a volume of said upper part of said fluid space.

8. The suspension device of claim 1 wherein an initial pressure of said silicone fluid and said inert gas is about 800 to about 1200 psi.

9. The suspension device of claim 1 further comprising:
   a rod end attached to said hollow rod;
   an overload pad attached to said rod end; and
   another overload pad attached to said cylinder, said overload pads being engageable for limiting movement of said hollow rod toward said cylinder.

10. The suspension device of claim 9 comprising a dust cover extending from said rod end toward said cylinder.

11. The suspension device of claim 1 further comprising a rebound pad disposed above said piston for limiting movement of said hollow rod away from said cylinder.

12. The suspension device of claim 4 further comprising
    a rod end attached to a top of said hollow rod;
    a downwardly facing overload pad attached to said rod end; and
    an upwardly facing overload pad supported at an upper end of said cylinder, said overload pads being engageable for limiting downward movement of said hollow rod with respect to said cylinder.

13. The suspension device of claim 4 further comprising a dust cover extending downwardly from said rod end toward said upper end of said cylinder.

14. The suspension device of claim 4 further comprising an upwardly facing rebound pad disposed above said piston and attached thereto for limiting upward movement of said hollow rod with respect to said cylinder.

15. The suspension device of claim 5 wherein said dimethyl polysiloxane has a viscosity of at least fifty centistokes.

16. The suspension devcie of claim 15 wherein said viscosity is in a range of about fifty centistokes to about one hundred centistokes.

17. A dual fluid suspension apparatus for trucks. said apparatus comprising:
    a cylinder having an upper end and a lower end;
    a piston disposed in said cylinder;
    a hollow rod attached to said piston and extending upwardly thereform out of said cylinder such that a fluid space is defined in said hollow rod and said cylinder, said fluid space having a lower part substantially in said cylinder and a relatively smaller upper part in said hollow rod;
    a rod end attached to an upper end of said hollow rod;
    a first overload pad attached to a lower side of said rod end;
    a second overload pad attached to an upper side of said upper end of said cylinder, said overload pads being matable for limiting movement of said hollow rod toward said cylinder; and
    a rebound pad attached to an upper side of said piston and engageable with said upper end of said cylinder for limiting upward movement of said hollow rod with respect to said cylinder.

18. The apparatus of claim 17 wherein:
    said lower part of said fluid space is filled with a silicone fluid; and
    said upper part of said fluid space is filled with a gas.

19. The apparatus of claim 18 wherein said inert gas is nitrogen.

20. The apparatus of claim 18 wherein said silicone fluid is dimethyl polysiloxane having a viscosity in a range of about fifty centistokes to about one hundred centistokes.

* * * * *

UNITED STATES PATENT AND TRADEMARK OFFICE
CERTIFICATE OF CORRECTION

PATENT NO. : 4,739,976
DATED : April 26, 1988
INVENTOR(S) : Walter I. Myers

It is certified that error appears in the above-identified patent and that said Letters Patent are hereby corrected as shown below:

Column 1, line 25, delete "Silicon" and insert --Silicone-- therefor; line 45, after "i.e.," and before "load", insert --low spring frequency rate at low load and a high frequency rate at the high--; lines 49, 50 and 66, delete "silicon" and insert --silicone-- therefor.

Column 2, line 55, delete "bushng" and insert --bushing-- therefor.

Column 3, line 26, delete "passages" and insert --passage-- therefor.

Column 4, line 32, delete "cubin" and insert --cubic-- therefor; line 62, delete "usuable" and insert --unusable-- therefor.

Claim 4, line 10, delete "compressibiity" and insert --compressibility" therefor.

Claim 12, line 2, after "ing" insert --:--.

Claim 16, line 1, delete "devcie" and insert --device-- therefor.

Claim 17, line 1, delete "." and insert --,-- therefor; line 6, delete "thereform" and insert --therefrom-- therefor.

Signed and Sealed this

Eleventh Day of October, 1988

*Attest:*

DONALD J. QUIGG

*Attesting Officer*  *Commissioner of Patents and Trademarks*